United States Patent

[11] 3,617,269

| [72] | Inventors | Karel Eugeen Verhille Mortsel; Robert Joseph Noe, Mortsel; Luciaan Frans Voet, St. Katelijne-Waver; Henri De Poorter, Mortsel, all of Belgium |
|---|---|---|
| [21] | Appl. No. | 724,586 |
| [22] | Filed | Apr. 26, 1968 |
| [45] | Patented | Nov. 2, 1971 |
| [73] | Assignee | Gevaert-Agfa N.V. Mortsel, Belgium |
| [32] | Priority | Apr. 26, 1967 |
| [33] | | Great Britain |
| [31] | | 19187/67 |

[54] SPECTRALLY SENSITIZED PHOTOCONDUCTIVE RECORDING MATERIAL
4 Claims, No Drawings

[52] U.S. Cl. ................................................. 96/1.7, 260/240
[51] Int. Cl. ........................................... G03c 5/02, G03c 5/04
[50] Field of Search .......................................... 96/1.5, 1.7, 106; 260/240 M

[56] References Cited
UNITED STATES PATENTS

| 3,128,179 | 4/1964 | Kendall et al................. | 96/1.7 |
| 3,177,210 | 4/1965 | Rosenoff...................... | 96/106 X |
| 3,369,902 | 2/1968 | Abbott......................... | 96/106 X |

OTHER REFERENCES

Grossweiner, " Sensitization of Photoconductive Effects in Zinc Oxide," Photochemistry and Photobiology, Jan. 1968, Vol. 8, pp. 411–412 and 416

*Primary Examiner*—George F. Lesmes
*Assistant Examiner*—R. E. Martin
*Attorney*—William J. Daniel ABSTRACT: Photoconductive zinc oxide for electrophotographic purposes is spectrally sensitized with methine dyes wherein the methine linkage connects two oxazole nuclei as such or forming part of a fused benzo-, naphto-, or furo-ring. The nuclei may be substituted with certain designated substituents. The photoconductive zinc oxide so sensitized is preferably applied from an aqueous coating medium to which the sensitizing agent was incorporated in the form of a solution thereof in an organic solvent which has a very low vapor pressure and is miscible with water in substantial proportions, a particularly preferred solvent being 4-hydroxy-4-methyl-2-pentanone.

SPECTRALLY SENSITIZED PHOTOCONDUCTIVE RECORDING MATERIAL

This invention relates to the spectral sensitization of photoconductive compositions, to such spectrally sensitized compositions, and to recording materials prepared therewith.

Photoconductive coatings containing a finely divided photoconductive substance e.g. photoconductive zinc oxide dispersed in a binder, are well known.

According to a technique disclosed in the U.S. Pat. Specification 3,128,179 photoconductive zinc oxide can be sensitized with various organic dyes, e.g., Rose Bengal.

A particular class of sensitizing agents proposed in the latter U.S. Pat. Specification includes dyes known in the art as simple cyanine dyes, carbocyanine dyes, and dicarbocyanine dyes, provided such dyes contain at least one carboxy group.

Spectral sensitization of photoconductive zinc oxide coated on a support from a homogeneous dispersion in a solution of an insulating binder in water or in an organic solvent can be performed with these dyes. In practice, however, their application is hindered considerably by their low fastness to light. Moreover, these dyes in general impart to the photoconductive layer a strong memory effect, in other words an irradiation of the layer before charging results in a prolonged state of conductivity of said layer. Preirradiation of a layer containing zinc oxide sensitized with these dyes considerably reduces the level to which the layer can be charged, unless the layer is stored for a sufficient time in the dark in order to regain its inherent chargeability.

Therefore, it is an object of the present invention to provide a class of spectral sensitizing agents for inorganic photoconductive substances such as photoconductive zinc oxide, which are characterized by favorable spectral sensitizing effects in aqueous as well as in organic medium, and which possess in addition to fastness to light, the property of sensitizing the photoconductive substance in such a way that it acquires only a small memory effect.

Said object can be accomplished by the use of methine dyes corresponding to the following general formula:

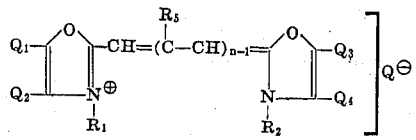

A wherein: each of $Q_1$, $Q_2$, $Q_3$, and $Q_4$ represents hydrogen, alkyl including substituted alkyl, e.g. $C_1$-$C_4$ alkyl, aralkyl including substituted aralkyl e.g. benzyl, halogen, amino, substituted amino including said amino groups in salt or quaternary form, or $Q_1$ together with $Q_2$ and/or $Q_3$ together with $Q_4$ represent the atoms necessary for closing a fused ring, e.g. a benzo-, naphto-, or furo-ring including such substituted ring, each of $R_1$ and $R_2$ represents alkyl including substituted alkyl e.g. $C_1$-$C_4$ alkyl, allyl, aralkyl, including substituted aralkyl e.g. benzyl, aryl including substituted aryl e.g. phenyl, at least one of $R_1$ and $R_2$ representing sulfatoalkyl e.g. sulfatoalkyl as described in the French Pat. Specification 1,149,769, preferably sulfatoethyl, sulfatopropyl, sulfatobutyl and sulfatoisobutyl, or phosphonoalkyl wherein the alkyl group is preferably $C_1$-$C_4$ alkyl, such as described in the British Pat. Specification 886,270 or a

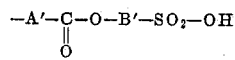

group wherein each of A' and B' represents alkylene or

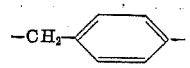

preferably $C_1$-$C_4$ alkylene e.g. a group as set forth in the British Pat. Specification 886,271 (for A and B respectively) such as sulfomethoxycarbonyl-methyl, ω-sulfopropoxycarbonylmethyl, ω-sulfobutoxycarbonyl-methyl, or p-(ω-sulfobutoxycarbonyl)-benzyl, or the groups -A-W-NH-V-B or

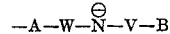

wherein each of W and V represents carbonyl, sulfonyl or a single bond, at least one of W or V being sulfonyl, A represents an alkylene group e.g. a $C_1$-$C_4$ alkylene group and B represents hydrogen, alkyl including substituted alkyl, amino including substituted amino, e.g. acylamino, diethylamino, or dimethylamino, with the proviso, however, that B does not represent hydrogen when V represents carbonyl or sulfonyl as e.g. described in the British Pat. Specification 904,332 the groups -A-W-NH-V-B and

being exemplified by N-(methylsulfonyl)-carbamyl-methyl, γ-(acetyl-sulfamyl)-propyl, and δ-(acetylsulfamyl)-butyl, or a -

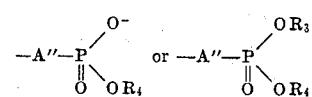

group wherein each of $R_3$ and $R_4$ represents hydrogen, alkyl including substituted alkyl, amino including substituted amino and A" represents alkylene preferably $C_1$-$C_4$ alkylene e.g. methylene, ethylene, propylene, or butylene, $R_5$ represents hydrogen or alkyl including substituted alkyl e.g. $C_1$-$C_4$ alkyl or benzyl, $X^1$ represents an anion, e.g., chloride, bromide, iodide, perchlorate, benzene sulfonate, toluene sulfonate, methyl sulfate, ethyl sulfate, propyl sulfate, but $X^1$ is not present if $R_1$ or $R_2$ contains an anionic group, and $n$ represents 1 or 2.

The sensitizing dyes used in the present invention can be allowed to absorb to the inorganic photoconductive substance, preferably photoconductive zinc oxide, by adding them to a dispersion of that substance in an organic or aqueous medium either or not already containing the binder.

Zinc oxide recording layers applied from organic solvents and binding agents soluble in the organic medium are described e.g., in the Belgian Pat. Specification 612,102 and in the British Pat. Application 19,186/67.

Zinc oxide recording layers applied from an aqueous medium are described e.g. in the published Dutch Pat. Applications 6608814 and 6608815.

The spectral sensitizing agents are preferably added in dissolved state, e.g. dissolved in a water-miscible solvent or in water, to a dispersion of the photoconductive zinc oxide. When applied in an aqueous zinc oxide dispersion they are preferably incorporated into the recording layer from an organic liquid consisting of or containing a solvent, which has a very low vapor pressure and which is at least for 20 percent by weight soluble in water at 20° C. Such a method for sensitizing a photoconductive material is described in the published Dutch Pat. Application 6704768, which application should be read in conjunction herewith.

Suitable dispersing agents for dispersing photoconductive zinc oxide in an aqueous medium are described in the published Dutch Pat. Application 6712156, which application should also be read in conjunction herewith.

When the sensitizing dyes of the present invention are used, the coloration of a recording layer containing white photoconductive zinc oxide can be kept very low for a very high sensitization yield.

The optimum quantity of sensitizing agent per gram of photoconductive zinc oxide can be determined easily by a series of tests. A useful range is comprised between 0.01 mg. and 1 mg. per gram of photoconductive zinc oxide. The weight ratio of zinc oxide to binder may vary between relatively large limits. A ratio of 1 part by weight of photoconductive substance to 0.1 to 0.6 part by weight of total content of binder is preferred. Advantageously, the coating mixture contains dispersed photoconductive zinc oxide in a weight ratio of 95 percent to 60 percent in respect of the total solids content of the coated and dried layer. The thickness of the photoconductive layer may be chosen between wide limits according to the requirements of each case. Good recording and reproduction results are attained with electrophotographic layers having a thickness of 1 to 20 μ, and preferably of 3 to 10 μ.

Preferably the sensitizing substances are used in combination with photoconductive zinc oxide prepared according to the French process.

The photoconductive recording layers containing a spectral sensitizing agent as above described may contain, in addition to the photoconductive substance(s) and the binder, spectral sensitizing agents of any other type (see e.g. British Pat. Specification 1,020,504), compounds increasing the dark-resistivity, e.g. the phosphorus compounds described in the Belgian Pat. Specification 612,102, and additives known in coating techniques e.g. pigments (see e.g. British Pat. Specification 1,007,349), compounds influencing the gloss and/or the viscosity, and compounds that counteract aging and/or oxidation of the layers, or which influence the thermal stability of the layers. When selecting any additives, preference is given to those which least reduce the dark-resistivity of the photoconductive layer.

The photoconductive composition sensitized according to the present invention may be coated on a support according to a known coating technique, e.g., by spraying, whirling, dip-coating, or by a coating technique wherein use is made of a doctor blade. The supports or base materials are chosen in view of the particular charging, exposure, recording, development and/or transfer technique wherein the recording material is used.

In electrophotographic recording techniques, wherein the photoconductive layer is electrostatically charged, the support preferably has an electric volume resistivity, which is considerably lower than that of the recording layer. Suitable supports are described e.g. in the British Pat. Specifications 995,491 and 1,020,504, 1,020,503 and in the U.S. Pat. Specification 3,008,825.

The photoconductive layer of an electrophotographic material, which is prepared starting from a coating composition according to the present invention, can be used for recording purposes, in which prior to exposure an electric charge is nondifferentially applied according to known methods. However, the material can also be used in recording techniques, in which the exposure step precedes the charging step. For such a technique we may refer to e.g. the British Pat. Specifications 1,033,419 and 1,033,420.

For comparison of the sensitivity of photoconductive recording elements, said elements are charged and exposed in the same manner, e.g. through a step-wedge, and developed in the same conditions. Well established methods of developing electrostatic images include cascade-, powder cloud-, magnetic brush- and fur brush-development. These methods are based on the application of charged dry toner to the surface bearing the electrostatic image. Other methods are based on the use of liquids, either insulating (electrophoretic development) or conductive liquids (see e.g. the U.S. Pat. Specification 2,907,674 and the Belgian Pat. Specifications 610,060 and 625,335). Development of a conductivity image based on electrolysis is described e.g. by J. A. Amick, RCA Rev., 20, 753 (1959).

The present invention is further illustrated in the following example.

Example

The following dispersions were prepared:
Dispersion type A

An amount of 1.972 kg. of a 20 percent solution of Vinnapas B100/20VL (a vinyl acetate polymer sold by Wacker Chemie G.m.b.H. Munchen, West Germany) in ethylene chloride and a solution of 48 g. of Hostalit CAM (a terpolymer of vinyl chloride, vinyl acetate, and maleic anhydride, sold by Farbwerke Hoechst, Frankfurt, West Germany) in a mixture of 0.208 l. of ethanol and 0.4 l. of ethyl methyl ketone were added successively to 1.96 l. of ethylene chloride.

The resulting solution was then diluted with 40 ml. of a 10 percent solution of tetrachloro-phthalic anhydride in ethanol and 32 ml. of a 10 percent solution of acid butyl phosphate in ethanol. Subsequently 1200 g. of photoconductive zinc oxide (French Process) was added while stirring slowly. The dispersion was completed by mixing thoroughly in a sand-mill at a rate of 24 l./hour.

The dispersion was then diluted at a rate of 62 g. of dispersion to 8 ml. of ethylene chloride and 1.2 ml. of a 1 percent solution of the dye (indicated in table 1) in a solvent (indicated in table 1).

The dispersion was coated on a glassine type paper pro rata of 25 g. of zinc oxide per sq.m., dried, and stored in the dark for 24 hours. The layer was then charged with a Corona of −7000 v. and irradiated for 15 sec. by means of a light bulb with a radiation capacity of 2240 lux (2750° K.) through a step wedge with constant 0.1. The number of entirely discharged step areas (these areas of the recording layer are not covered with developer particles and are called the "non-blackened steps") is listed in table I as a measure for the sensitivity of the layer. An increase of that number by 3 means a doubling of the sensitivity.

Dispersion type B

An amount of 20 g. of photoconductive zinc oxide, 25 ccs. of water, and 1 cc. of a 10 percent solution of copoly(maleic anhydride/N-vinyl pyrrolidone) (51.7/48.3) in a concentrated technical ammonia-water (1:9) solution was mixed for 10 minutes with a high speed stirrer such as a Kothoff mixer. The dispersion was then added to a solution of 2 g. of poly(vinyl acetate/crotonic acid) (94.4/5.6) and 1.25 ml. of Cassurit-MLP (partially etherified melamine-formaldehyde resin marketed as a 80 percent aqueous solution by Cassella Farbwerke, Mainkur A.G., Frankfurt a/Main, West Germany) in 25 ccs. of water and 1 cc. of a concentrated aqueous ammonia solution (25 percent by weight). The composition was sensitized by one of the sensitizing agents listed in the following table. Each sensitizing dye was added in an amount of 0.5 mg. per gram of zinc oxide in the form of a 0.1 percent solution and was intimately mixed with the ground composition.

Each sensitized composition was coated on a baryta paper weighing 90 g./sq.m. pro rata of 25 g. of zinc oxide per sq.m.

The layer was dried and stored in the dark for 24 hours. The charging, irradiation and development proceeded as described for Dispersion type A. The sensitometric results are also listed in table I.

TABLE I

| Dye | Solvent used for dissolving the dye | Type A dispersion (Number of non-blackened steps) | Type B dispersion (Number of non-blackened steps) |
| --- | --- | --- | --- |
| [structure with CH₂—CO—NH—SO₂CH₃ and C₂H₅ groups] J⊖ | Ethylene glycol monomethyl ether. | 15 | 20 |
| [structure with (CH₂)₄—SO₂NH—COCH₃ groups] Br⊖ | 4-hydrozy-4-methyl-2-pentanone. | 15 | 25 |

Table 1—Continued

| Dye | Solvent used for dissolving the dye | Number of non-blackened steps | |
|---|---|---|---|
| | | Type A dispersion | Type B dispersion |
| [structure] | Diethylene glycol methyl ether. | 15 | 20 |
| [structure] | Ethanol | 17 | 22 |
| [structure] | Dimethylformamide. | 16 | 18 |
| [structure] | 4-hydroxy-4-methyl-2-pentanone. | .......... | 19 |
| [structure] | Ethanol/trichloroethylene (50/50). | 17 | 26 |
| [structure] | Ethanol | 17 | 20 |
| [structure] | ....do.... | 16 | 25 |
| [structure] | Dimethylformamide. | .......... | 21 |
| [structure] | 4-hydroxy-4-methyl-2-pentanone. | .......... | 20 |
| [structure] | ....do.... | | 16 |
| [structure] | ....do.... | | 18 |

Table I—Continued

| Dye | Solvent used for dissolving the dye | Number of non-blackened steps Type A dispersion | Number of non-blackened steps Type B dispersion |
|---|---|---|---|
| (structure with C$_3$H$_7$, (CH$_2$)$_3$OSO$_3^-$, (CH$_2$)$_3$OSO$_3$H) | Ethanol/water (50/50). | ---------- | 15 |
| (structure with CH$_2$—CO—NH—SO$_2$CH$_3$, Br$^-$) | Dimethylformamide. | ---------- | 16 |

We claim:

1. A photoconductive recording material comprising photoconductive layer applied from an aqueous coating composition and containing zinc oxide in admixture with a spectral sensitizing agent therefor corresponding to the general formula:

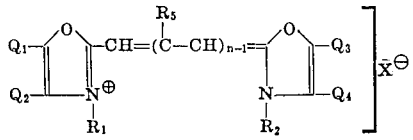

wherein:
each of $Q_1$, $Q_2$, $Q_3$ and $Q_4$ represents hydrogen, a $C_1$-$C_4$ alkyl group, a benzyl group, or $Q_1$ together with $Q_2$ and/or $Q_3$ together with $Q_4$ represent the atoms necessary for closing a fused benzo, naphtho, or furon ring,
each of $R_1$ and $R_2$ represents a -A-W-NH-V-B group, wherein each of W and V represents carbonyl, sulfonyl, or a monovalent chemical bond, at least one of W or V being sulfonyl, A represents a $C_1$-$C_4$ alkylene group and B represents a lower alkyl group,

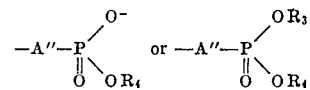

$R_5$ represents hydrogen, benzyl or a $C_1$-$C_4$ alkyl group,
$X^1$ represents an anion, and
$n$ represent 1 or 2.

2. A photoconductive recording material according to claim 1, containing a photoconductive layer comprising photoconductive zinc oxide dispersed in a binder, which during the coating step was dissolved in an aqueous alkaline medium.

3. A photoconductive recording material comprising an inorganic photoconductive substance which is spectrally sensitized with a dye as described in claim 1, which dye in the formation of the photoconductive coating has been dissolved in an organic solvent having a very low vapor pressure and being miscible with water in concentrations of at least 20 percent by weight at 20° C.

4. A photoconductive recording material according to claim 3, wherein said solvent is 4-hydroxy-4-methyl-2-pentanone.

UNITED STATES PATENT OFFICE
CERTIFICATE OF CORRECTION

Patent No. 3,617,269        Dated November 2, 1971

Inventor(s) Karel Eugeen VERHILLE et al

It is certified that error appears in the above-identified patent and that said Letters Patent are hereby corrected as shown below:

Column 8, Claim 1, line 25, delete the entirety of the formula beginning at $-A''-P$ etc.

Column 8, Claim 1, line 31, change "$X^1$" to -- $X^-$ --.

Signed and sealed this 11th day of April 1972.

(SEAL)
Attest:

EDWARD M. FLETCHER, JR.
Attesting Officer

ROBERT GOTTSCHALK
Commissioner of Patents